Oct. 17, 1950     B. DOWICK     2,526,208
CHUCK FOR MOTOR DRIVE SHAFTS
Filed May 23, 1944
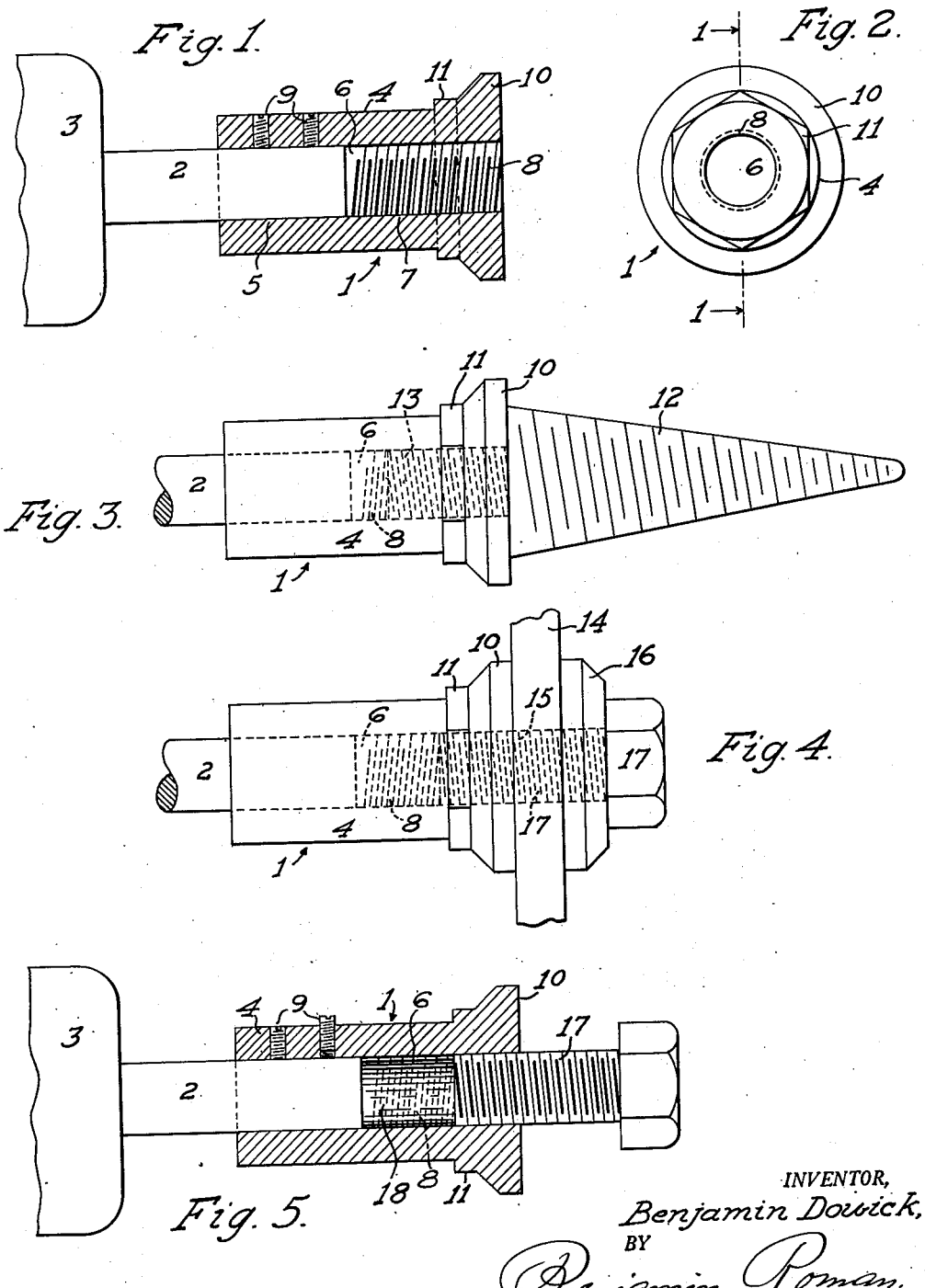
INVENTOR,
Benjamin Dowick, Patented Oct. 17, 1950

2,526,208

UNITED STATES PATENT OFFICE 2,526,208

CHUCK FOR MOTOR DRIVE SHAFTS

Benjamin Dowick, Jersey City, N. J.

Application May 23, 1944, Serial No. 536,891

2 Claims. (Cl. 279—1)

1

This invention relates to a chuck mountable upon an electric motor drive shaft, for therewith securing a variety of working implements that operate rotatably, as buffing or polishing wheels, saws, etc.

Chucks for the above purpose were heretofore inefficient, in that they were capable of holding but one or two kinds of tools. Also, when such chucks are in mounted condition they tend to get stuck or "frozen" upon the drive shaft, in which event it is very difficult to remove the chuck, and efforts resorted to for dislodging it frequently results in injury to the motor.

The principal object of the invention is to remedy the above mentioned disadvantages, and to provide a chuck for the above purpose which will be simplified, inexpensive, conveniently and economically manufacturable, conveniently and efficiently utilizable, and improved; wherewith a large variety of implements may be operatively secured; and which, when "frozen" upon the drive shaft, may be therefrom removed with ease, efficiency, and without any injury to the motor.

Other objects and advantages will hereinafter appear.

In the accompanying drawings:

Fig. 1 is a longitudinal cross-sectional elevation of the chuck constituting the invention, taken on the line 1—1 of Fig. 2, and showing it as operatively mounted upon the electric motor drive shaft.

Fig 2 is a rear end elevation of the chuck shown in Fig. 1.

Figs. 3 and 4 are elevational views of the chuck, illustrating its adaptability for therewith securing a variety of working implements.

Fig. 5 is a view of the chuck, similar to Fig. 1, and illustrating the manner of its removal when becoming stuck upon the drive shaft.

The chuck 1, mountable upon the drive shaft 2 of an electric motor 3, comprises a cylindrical member 4, the rear portion 5 of the bore 6 of which is smooth while its forward portion 7 is provided with a tap 8. For mounting the chuck in operative condition it is slid longitudinally upon the shaft 2, and is thereto secured by means of setscrews 9 threading therethrough and against the shaft, as shown. The chuck 1 is made by means of die-casting, and integrally therewith is formed at its forward end a flange 10 and hexagonal portion 11, the flange serving to coact in efficiently holding and securing the working implement, and said hexagonal portion being resorted to in the manipulation of mounting the chuck upon and demounting it from the shaft 2.

2

It will be evident to those versed in the operations with various rotary working implements that a large number of types thereof may be secured to and held by the chuck 1 with ease and efficiency. Thus, many implements as buffing or polishing wheels, rotary brushes, etc., are usually carried upon a conical stud 12 provided with a threaded lug 13, Fig. 3, and all that is required, therefore, to secure any such implement to the chuck 1 is to thread the lug 13 into the tap 8 of the chuck, with the stud 12 bearing against the flange 10.

On the other hand, other implements 14, as circular saws, grinders, wire brushes, etc., are usually provided with central bores 15. To therefore secure and hold such implement operatively to the chuck 1, it is placed concentrically against its flange 10, a flange 16 is placed against the opposite face of the implement, and a screw 17 is passed through the flange 16 and implement 14 and threaded into the tap 8 and against flange 16, in the manner illustrated in Fig. 4.

In utilizing the electric motor 3 in connection with the chuck 1, it is often necessary to remove the latter from its shaft 2, and this is readily performed by removal of the set-screws 9 and rotatingly manipulating the chuck about the shaft by application of a wrench upon its hexagonal portion 11. When however the chuck 1 is mounted upon the shaft 2 for a long period of time, and especially under certain condition of work, atmosphere, and temperatures, it happens that the chuck may become stuck upon the shaft, so as to completely resist removal by the aforesaid means. In such event, Fig. 5, a block 18 may be inserted into the tapped bore 8 against the terminal of the shaft 2, and a screw 19 may be threaded into the tap against the block, whereupon the great force thus exerted against the shaft terminal will cause the chuck to slide off the shaft, without in any way impairing the motor 3, as the applied force is entirely against the shaft terminal.

Having thus described my invention, I claim:

1. A chuck for therewith operatively attaching selectively any one of a variety of working implements to an electric motor drive shaft comprising a cylindrical member having a bore clear therethrough, said bore being adapted to slide longitudinally over said shaft for mounting the member on the shaft, means for removably securing said member to said shaft, said bore being tapped for thereby threadingly securing any one of said implements to said member, and said tapped portion being adapted for thereinto threading a screw coaxially with said shaft against the terminal of the shaft for thereby slidingly disengaging the member from the shaft in the event of its freezing to the shaft after removal of said securing means.

2. A chuck for therewith operatively attaching a working implement to an electric motor drive shaft comprising a cylindrical member having a bore clear therethrough, said bore being adapted to slide longitudinally over said shaft for mounting the member on the shaft, means for removably securing said member to said shaft, said bore being tapped for thereby threadingly securing said implement removably to said member, and said tapped portion being adapted for thereinto threading a screw coaxially with said shaft against the terminal of the shaft for thereby slidingly disengaging the member from the shaft in the event of its freezing to the shaft after removal of said securing means.

BENJAMIN DOWICK.

REFERENCES CITED

The following references are of record in the file of this patent:

UNITED STATES PATENTS

| Number | Name | Date |
|---|---|---|
| 533,707 | Fuller et al. | Feb. 5, 1895 |
| 984,978 | Straub | Feb. 21, 1911 |
| 1,577,467 | Jeffries et al. | Mar. 23, 1926 |
| 2,071,954 | Scruggs | Feb. 23, 1937 |
| 2,286,292 | Mall | June 16, 1942 |
| 2,290,215 | Stenberg | July 21, 1942 |

FOREIGN PATENTS

| Number | Country | Date |
|---|---|---|
| 622,303 | Germany | of 1935 |